United States Patent
Affolter et al.

(10) Patent No.: US 12,213,615 B2
(45) Date of Patent: *Feb. 4, 2025

(54) ADAPTER FOR USE IN PREPARING A BEVERAGE BY MEANS OF A CAPSULE AND A BEVERAGE PREPARATION DEVICE

(71) Applicant: DELICA AG, Birsfelden (CH)

(72) Inventors: Roland Affolter, Möriken (CH); Tim Thilla, Weil am Rhein (DE); Markus Brönnimann, Hermrigen (CH)

(73) Assignee: Delica AG, Birsfelden (CH)

( * ) Notice: Subject to any disclaimer, the term of this patent is extended or adjusted under 35 U.S.C. 154(b) by 1002 days.

This patent is subject to a terminal disclaimer.

(21) Appl. No.: 16/976,883

(22) PCT Filed: Mar. 12, 2018

(86) PCT No.: PCT/EP2018/056072
§ 371 (c)(1),
(2) Date: Aug. 31, 2020

(87) PCT Pub. No.: WO2019/174711
PCT Pub. Date: Sep. 19, 2019

(65) Prior Publication Data
US 2021/0000284 A1 Jan. 7, 2021

(51) Int. Cl.
*A47J 31/06* (2006.01)
*B65D 85/804* (2006.01)

(52) U.S. Cl.
CPC ....... *A47J 31/0647* (2013.01); *A47J 31/0668* (2013.01); *B65D 85/8043* (2013.01)

(58) Field of Classification Search
CPC .. A47J 31/06; A47J 31/02; A47J 31/00; A47J 31/0642; A47J 31/0647; A47J 31/0668
(Continued)

(56) References Cited

U.S. PATENT DOCUMENTS

2004/0228955 A1* 11/2004 Denisart ............ B65D 85/8046
426/590
2011/0113968 A1* 5/2011 Schmed ................ A47J 31/407
99/302 R
(Continued)

FOREIGN PATENT DOCUMENTS

EP 2 401 945 A1 1/2012
EP 3 272 671 A1 1/2018
(Continued)

OTHER PUBLICATIONS

Machine translation of EP 3272672 performed on Nov. 17, 2023.*
(Continued)

*Primary Examiner* — Nathaniel E Wiehe
*Assistant Examiner* — Alba T Rosario-Aponte
(74) *Attorney, Agent, or Firm* — Finch & Maloney PLLC

(57) ABSTRACT

An adapter (1) for preparing a beverage by a capsule (2) and a beverage preparation device (3). The adapter (1) has a disk-shaped main body (17) with a capsule side (4) and a device side (7). On the capsule side (4), a mechanism (5) for introducing a liquid into the capsule (2) and mechanism (6) for discharging a liquid from the capsule (2) are arranged. On the device side (7), an inlet (8) and an outlet (9) are arranged. The inlet (8) is fluidically connected to the mechanism (5) for introducing the liquid, and the outlet (9) is fluidically connected to the mechanism (6) for discharging the liquid. The device side (7) is at least partially covered with a covering (67) to form an intermediate volume (19), between the main body (17) and the covering (67), which fluidically connects the inlet (8) to the mechanism (5) for introducing the liquid.

26 Claims, 9 Drawing Sheets

(58) Field of Classification Search
USPC .......................................... 99/284, 279, 295
See application file for complete search history.

(56) References Cited

U.S. PATENT DOCUMENTS

2015/0059588 A1* 3/2015 Castellani ........... A47J 31/0668
                                                              99/295
2016/0316958 A1* 11/2016 Rijskamp .............. A47J 31/407

FOREIGN PATENT DOCUMENTS

| EP | 3272672 A1 * | 1/2018 | ......... B65D 85/8049 |
| EP | 3272675 A1 * | 1/2018 | ......... B65D 85/8043 |
| EP | 3 301 041 A1 | 4/2018 | |
| GB | 2499201 A | 8/2013 | |

OTHER PUBLICATIONS

Machine translation of EP 3272675 performed on Nov. 17, 2023.*
International Search Corresponding to PCT/EP2018/056072 mailed Jun. 12, 2018.
Written Opinion Corresponding to PCT/EP2018/056072 mailed Jun. 12, 2018.

* cited by examiner

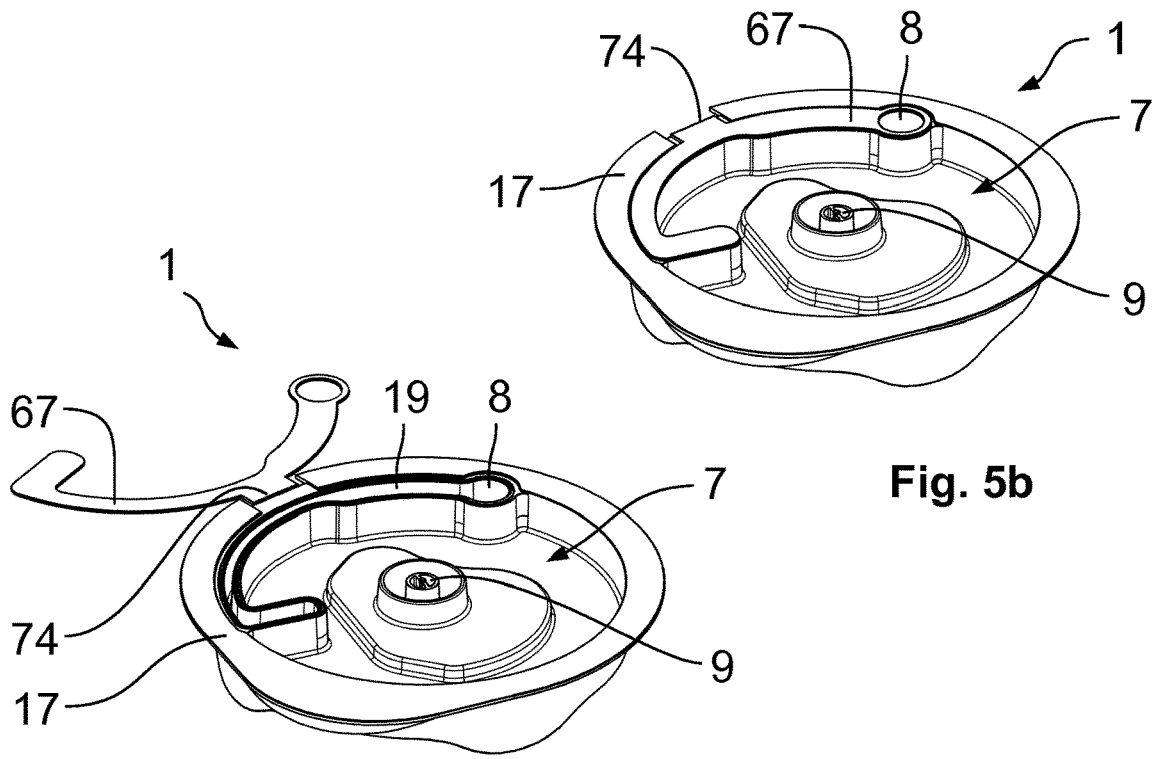
Fig. 5b
Fig. 5a
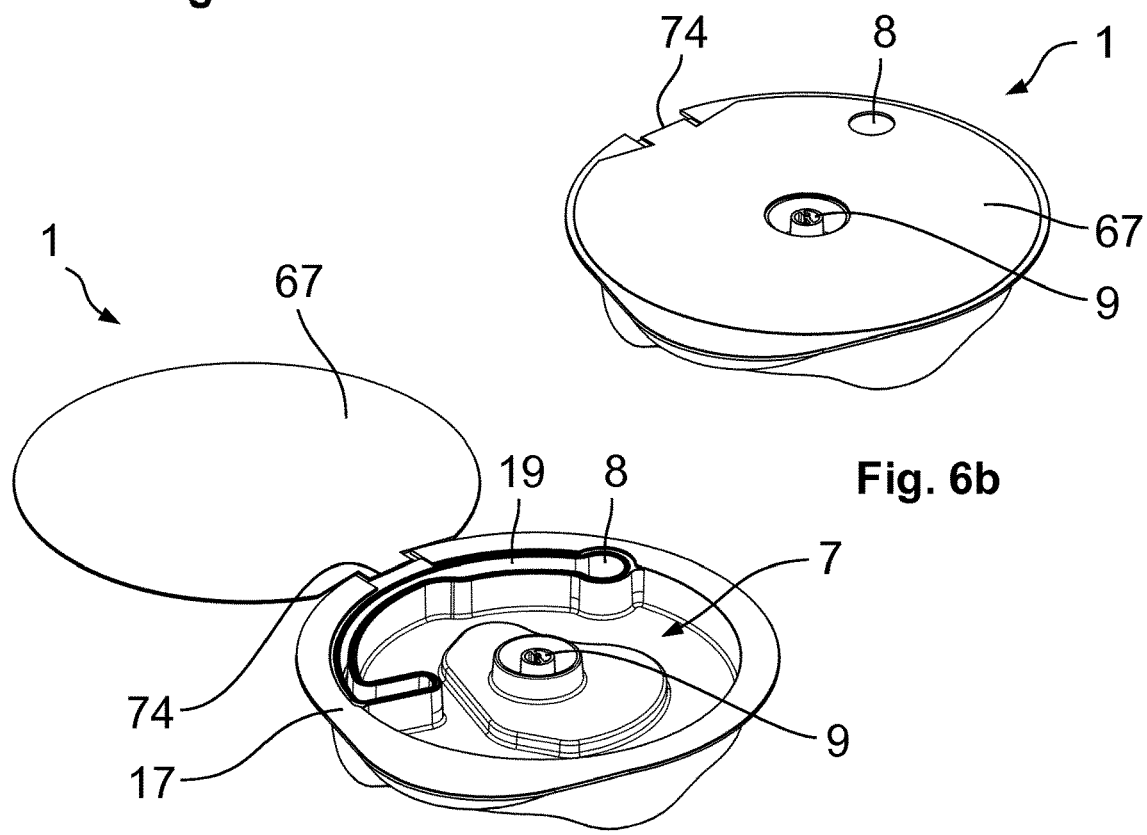
Fig. 6b
Fig. 6a

ADAPTER FOR USE IN PREPARING A BEVERAGE BY MEANS OF A CAPSULE AND A BEVERAGE PREPARATION DEVICE

This application is a National Stage completion of PCT/EP2018/056072 FILED Mar. 12, 2018.

FIELD OF THE INVENTION

The present invention relates to an adapter for use in preparing a beverage by means of a capsule and a beverage preparation device, wherein the adapter can be placed together with the capsule into the beverage preparation device.

BACKGROUND OF THE INVENTION

A multiplicity of different portion packs and systems for producing beverages are known in the prior art. In particular, capsules are frequently used for preparing different hot beverages, especially coffee or tea, but also milkshakes, in the home. Such capsules, which are designed as disposable products, conventionally comprise a capsule body for receiving the beverage ingredients and a cover covering the capsule body. The ingredients are generally roasted and ground coffee beans, but sometimes are also dried tea leaves. However, soluble products in general or concentrates are also suitable. During the actual preparation, pressurized water is conducted through the capsule, as a result of which the material contained in the chamber is extracted or dissolved.

More recently, the number of commercially available beverage preparation systems based on capsules of the abovementioned type has increased significantly. Each of the systems generally comprises capsules of different configuration and size. In order to make it possible for a user to use a capsule of one system with a beverage preparation device of another system, various adapters are also obtainable. For example, EP 2 401 945 A1 describes an adapter device for a beverage preparation device. Said adapter device provides a receiving space which is adapted to the outer contour of a capsule and into which said capsule can be placed. After the receiving space has been closed with a cover, the adapter device together with the capsule can be placed into a capsule holder of the beverage preparation device, which capsule holder is designed for a different type of capsule. The adapter device provides means for introducing a liquid into the capsule and means for discharging a liquid from the capsule, which means correspond with the means of the beverage preparation device. This adapter device provides a possibility of using a capsule by means of beverage preparation devices of different systems.

However, said adapter device has the disadvantage of having to be of multi-part design because of the fact that the capsule is completely enclosed. Furthermore, the device leads to a comparatively large reduction in the available volume of the capsule holder. Also, it can be used only in combination with an individual type of capsule since the receptacle is adapted exactly to the outer contour of the capsule. Not least, the use of such an adapter device is awkward since, after the beverage has been prepared, the user has to open the adapter device in order to remove the capsule from the receptacle thereof.

SUMMARY OF THE INVENTION

It is therefore an object of the present invention to overcome the abovementioned disadvantages in the prior art. In particular, it is an object of the present invention to provide a diversely useable adapter for use in the preparation of a beverage by means of a capsule and a beverage preparation device, which adapter can be manufactured and used more simply and cost-effectively. The adapter is intended in particular to provide greater user friendliness and can also be used if required in conjunction with various capsules of different size and/or different types.

These objects are achieved by an adapter which has the features as claimed the independent claim(s). The adapter is suitable for use in preparing a beverage by means of a capsule and a beverage preparation device. The adapter can be placed here together with the capsule into the beverage preparation device. The adapter has an in particular disk-shaped basic body with a capsule side and a device side. Means for introducing a liquid into the capsule and means for discharging a liquid from the capsule are arranged on the capsule side of the basic body. An inlet for a liquid provided by the beverage preparation device and also an outlet are arranged on the device side of the basic body, wherein the inlet is fluidically connected to the means for introducing the liquid into the capsule and the outlet is fluidically connected to the means for discharging the liquid from the capsule. The device side of the basic body is at least partially covered with a covering in order to form an intermediate volume between the basic body and the covering, via which intermediate volume the inlet is fluidically connected to the means for introducing the liquid into the capsule. By means of the configuration of the adapter with a basic body and a covering, a fluidic connection between inlet and the means for introducing the liquid into the capsule can be produced in a simple manner. In particular, it is conceivable for the inlet and the means for introducing the liquid into the capsule to be placed separated locally from one another such that the adapter can be adapted to the specific conditions of the beverage preparation device and to the capsules which are to be used.

The device side of the basic body can be completely covered with the covering. It is likewise also conceivable for only that part of the device side which is required for forming the intermediate volume to be covered with the covering.

The basic body can be manufactured from a plastics material, in particular by means of injection molding. Production by means of injection molding technology permits cost-effective mass production, with it nevertheless being possible to maintain exacting tolerances. The use of plastics material permits cost-effective production of the adapter, the production in particular also being food-compatible. Materials selected from the group comprising PP (polypropylene), PET (polyethylene terephthalate), PBT (polybutylene terephthalate), PS (polystyrene) and PC (polycarbonate) are preferably used for the adapter.

The covering of the basic body can be formed by a film or foil, in particular an aluminum foil or a plastics film, preferably a plastics film composed of a plastics material selected from a list comprising PET, PET/PP or PET/hot-sealing lacquer. It is likewise conceivable for the covering to be composed of a laminate consisting of a plurality of layers of plastics and/or of a laminate comprising plastics material and metal. The thickness of this covering is preferably 37 µm.

The covering can be formed integrally with the basic body. Particularly cost-effective production is possible by means of such an integral design. For example, the covering can be injection molded simultaneously with the basic body by injection molding technology, with the covering preferably being connected to the basic body via a film hinge.

The covering for forming the intermediate volume can be connected to the basic body by adhesive bonding and/or sealing, in particular by hot sealing or ultrasonic sealing. Of course, all other variants of connection, in particular even a snap connection or a welding connection, are suitable.

The means for introducing the liquid into the capsule can comprise at least one penetration element, in particular a puncture cannula, for penetrating a contact surface of the capsule. Said contact surface is conventionally formed by the cover of the capsule; said cover is normally composed of a plastics film and/or aluminum foil and/or a laminate.

The at least one penetration element can be designed in such a manner that, when the capsule and the adapter are placed into the beverage preparation device and when the device is closed, the contact surface of the capsule can be penetrated by the at least one penetration element. Accordingly, for the penetration of the contact surface, a user merely has to apply the same force which is required in any case for closing the beverage preparation device.

The means for discharging the liquid from the capsule can comprise at least one, preferably a plurality of, penetration element(s), in particular selected from the list comprising pyramids, spikes, cones, truncated pyramids, truncated cones, cylinders and prisms, for penetrating the contact surface of the capsule.

Said penetration element of the means for discharging the liquid from the capsule can be dimensioned in such a manner that the contact surface of the capsule is only penetrated when a certain internal pressure prevails in the capsule. Accordingly, in particular for coffee, pre-brewing or wetting of the coffee powder is possible before the effective extraction starts and the prepared beverage emerges from the capsule.

The means for discharging the liquid from the capsule can comprise at least one in particular encircling collecting channel. There are preferably a plurality of collecting channels which connect the penetration means to one another and in the direction of the outlet. Said collecting channels can be configured in such a manner that, together with the cover or the contact surface of the capsule, they form a fluid duct. By means of the formation of such a duct, the liquid emerging from the capsule is collected and discharged in a targeted manner. An uncontrolled dripping after the preparation of the beverage has finished is prevented or at least reduced.

The means for discharging the liquid from the capsule and in particular also the outlet can be arranged in a central region of the adapter. Such an arrangement of the means for discharging the liquid from the capsule or the outlet makes sense in particular if the adapter is intended to be used with a corresponding beverage preparation device which likewise has a means corresponding to the outlet of the adapter, in order to introduce the beverage into a vessel.

The means for introducing a liquid into the capsule and in particular also the inlet can be arranged in an edge region of the adapter. In combination with the centrally arranged outlet, there is therefore the possibility of being able to inject liquid into a capsule on the edge side and to remove same from the capsule in a central region. Accordingly, a substantially radial flow of fluid is produced in the capsule.

The capsule side can have at least one, in particular a plurality of, structure(s) for securing and/or positioning the capsule. Such structures for securing and/or positioning the capsule permit a positionally stable orientation of capsule and adapter. It can be ensured that the capsule and the adapter are not mutually displaced.

The structures for securing and/or positioning the capsule can have a projection, which is configured in particular to be circular-cylindrical, for engaging in a corresponding offset of the capsule. The configuration of the structures as a projection can be produced particularly cost-effectively.

The adapter can have, on at least one structure, latching means, preferably in the form of a groove and/or a latching lug, which can be latched to corresponding latching means of the capsule. Such latching means permit preassembly of the capsule on the adapter, and therefore the two parts can be placed together into the beverage preparation device, rather than individually. It is thus also conceivable, for example, for capsules and adapters that are already preassembled to be sold.

The outlet can be arranged within an in particular centrally arranged projection. Such a projection which has the outlet can additionally have a rising channel which, together with a corresponding offset of the capsule, forms a rising duct which leads to the outlet of the adapter. The formation of a rising duct upstream of the outlet prevents or reduces dripping after the preparation of a beverage has finished.

The rising channel can be configured in such a manner that, together with the offset of the capsule, it forms an outlet nozzle for forming a beverage jet. The formation of a beverage jet provides an additional possibility of influencing the properties of the prepared beverage.

An air inlet opening, in particular an air inlet slot, can be arranged in the region of the outlet nozzle in such a manner that the beverage jet can entrain air. Accordingly, the dispensed beverage is mixed with air. In particular during the production of a coffee beverage, frothing may be desired. Also during the production of a milk beverage, frothing is frequently desired, for example for a cappuccino or a latte macchiato.

In the outlet, the adapter can have an impact wall toward which the outlet nozzle is directed. A beverage jet will therefore strike against said impact wall, thus resulting in additional mixing of the beverage with air. Such an impact wall also leads to a uniform configuration of the beverage and air mixture.

The basic body of the adapter can have at least one window or a transparent region through which a machine-readable code arranged on the contact surface of the capsule can be read by the beverage preparation device, in particular for setting the operating parameters thereof, when the adapter is placed together with the capsule into the beverage preparation device. This configuration of the adapter and of the corresponding capsule ensures that, when the capsule is used, the correct parameters are always set at the beverage preparation device irrespective of the type of adapter used. Confusion which could result in the setting of erroneous operating parameters at the beverage preparation device is therefore effectively avoided. Of course, it is required for this purpose that the beverage preparation device has corresponding means in order to be able to read such a code at all.

Instead of transparent regions, it is also possible, of course, for the entire adapter to be formed transparently in order for the machine-readable code on the contact surface of the capsule to be readable. Alternatively, it is, however, also conceivable for such a machine-readable code to be arranged directly on the adapter, in particular on the basic body or on the covering of the adapter.

The covering which covers the basic body in order to form an intermediate volume can have a recess in the region of the inlet and/or the outlet. Such a recess can simplify insertion of the adapter into a correspondingly configured beverage preparation device since the covering does not have to be pierced separately.

The device side of the basic body can have an offset, in particular in the form of a partially encircling fluid duct, for forming the intermediate volume. The formation by means of an offset makes it possible for the entire volume of said intermediate volume to be precisely defined, which, in turn, prevents or at least reduces dripping after a beverage has been prepared.

The basic body of the adapter can comprise a gripping tab which firstly facilitates the handling of the adapter for a user and secondly can also be used for aligning the adapter in a beverage preparation device.

A further aspect of the present invention relates to a capsule for preparing a beverage with an adapter as described above and with a beverage preparation device. The capsule is placed together with the adapter into the beverage preparation device, wherein the capsule comprises a capsule body which is covered with a cover. In this case, the cover forms the contact surface of the capsule with respect to the adapter and at the same time closes the capsule body, in particular hermetically.

The capsule body can have at least one offset for engagement of a projection of the adapter. This offset can be used both for aligning and positioning the capsule on the adapter and/or for securing the capsule to the adapter.

The at least one offset can be covered by the cover of the capsule.

The capsule can contain a beverage starting product, in particular roasted or ground coffee or dried tea leaves. It is likewise conceivable for the capsule to contain soluble substances in order, for example, to be able to prepare milkshakes. It is likewise conceivable for the capsule to contain a liquid concentrate from which a beverage can be prepared.

A further aspect of the present invention relates to a set comprising an adapter as described previously and a capsule which fits onto said adapter. The capsule can be configured in particular as previously described.

The adapter can be preassembled on the capsule. Owing to the set consisting of capsule and adapter being preassembled, the user friendliness is substantially increased. The set can simply be inserted like a conventional capsule into the beverage preparation device. The use of a set consisting of capsule and adapter permits a high degree of modularity which permits simple adaptation to different beverage preparation devices, to different requirements of the beverage substances used for the preparation and to the desired beverage. A set of this type consisting of adapter and capsule in particular affords the advantage that the capsule can be constructed significantly more simply than capsules which are conventionally used in comparable applications. As a result, the process and the system for filling such a capsule with a beverage substance turn out to be simpler.

Furthermore, it is simpler to produce such a capsule in an oxygen-tight design. The capsule can be configured in a simple manner and can be configured in particular without complex contours or structures.

A further aspect of the present invention relates to a beverage preparation system comprising a set as previously described and a beverage preparation device.

BRIEF DESCRIPTION OF THE DRAWINGS

Further advantages and individual features of the present invention emerge from the description below of a plurality of exemplary embodiments and from the drawings, in which, schematically:

FIGS. 6a and 6b show a perspective view of a further embodiment of an adapter according to the invention.

DETAILED DESCRIPTION OF THE PREFERRED EMBODIMENTS

Figure 1:
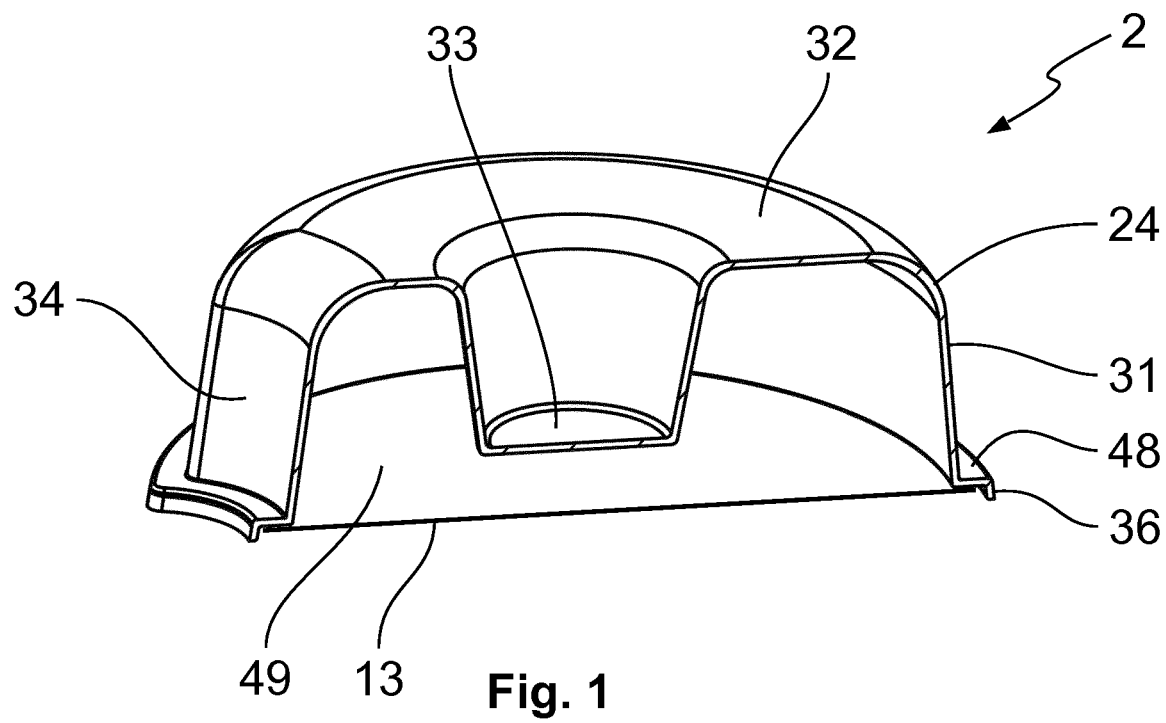
FIG. 1 shows a perspective sectional view of a capsule for preparing a beverage.

FIG. 1 shows, in a perspective sectional view, a capsule 2 for preparing a beverage, which capsule is provided, for example, for use with an adapter according to the invention. The capsule 2 substantially consists of a capsule body 24 with a side wall 31, a base 32 and a flange-like edge 48. A cover is fastened to said flange-like edge 48, said cover, in interaction with the adapter, constituting a contact surface 13. The cover closes off the capsule body 24 and therefore forms a substance chamber 49 for receiving a substance required for the production of a beverage. The side wall 31 and part of the base 32 are provided with a lateral recess 34. The base 32 of the capsule body 24 has a centrally arranged, circular elevation 33 which extends in the direction of the capsule opening. The flange-like edge 48 is provided, at its outer end, with an encircling extension 36 which forms an additional sealing function together with an adapter according to the invention.

Figure 2:
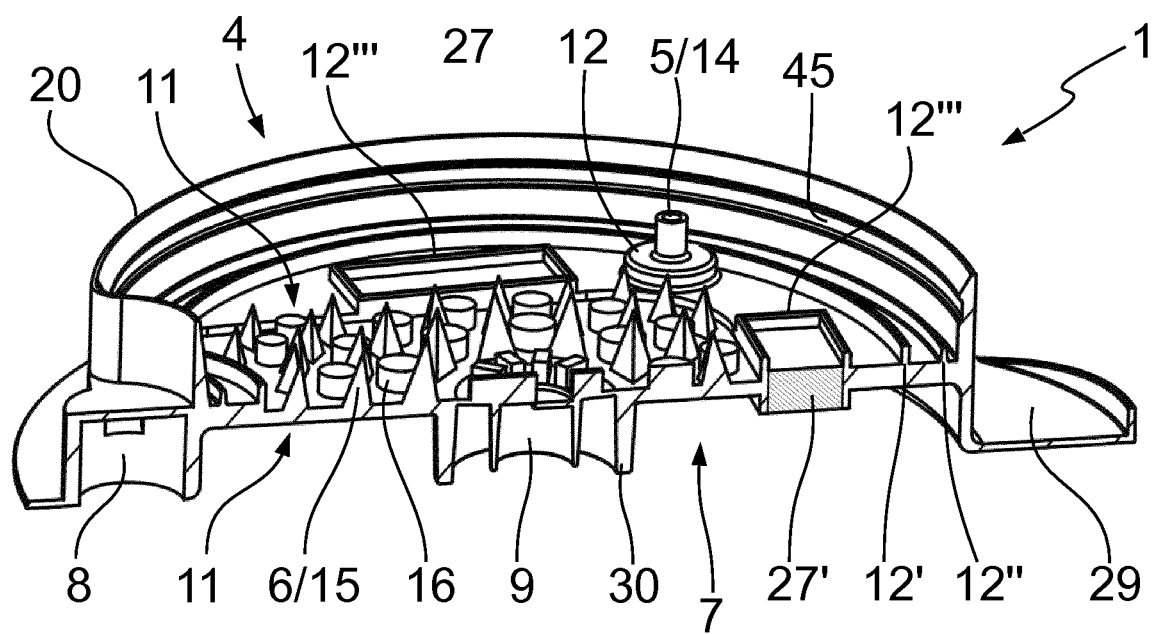
FIG. 2 shows a perspective sectional view of an adapter according to the invention.

FIG. 2 shows a perspective sectional view of an adapter 1 according to the invention. This adapter 1 is provided for assembly with a capsule 2 (see FIG. 1). The adapter 1 is substantially configured as a disk-shaped formation and has a capsule side 4 pointing upward in the sectional view, and a downwardly directed device side 7.

Furthermore, the adapter 1 is configured to be substantially circular and has a gripping tab 29 protruding laterally. The gripping tab 29 serves firstly as a gripping element for a user and secondly for aligning the adapter 1 in a beverage preparation device. The capsule side 4 of the adapter 1 has a discharging region 11. The discharging region 11 is surrounded by a sealing element 12'. Furthermore, a puncture cannula 14 as a means 5 for introducing a liquid into a capsule 2 (see FIG. 1) is arranged on the capsule side 4. The puncture cannula 14 is surrounded by a sealing element 12. The discharging region 11 has a multiplicity of penetration elements in the form of triangular pyramids 15. In addition to said pyramids 15, supporting elements in the form of truncated cones 16 are also arranged in the discharging region 11. The triangular pyramids 15 together with the truncated cones 16 form a means 6 for discharging a liquid from a capsule. In order to position a capsule on the adapter 1, the latter has an encircling collar 20. Furthermore, there are two transparent regions 27, 27' through which a code on the cover or the contact surface 13 (see FIG. 1) of a capsule placed onto the adapter 1 can be machine-read from the device side 7 of the adapter 1. On its encircling collar 20, the adapter 1 has a latching means in the form of an encircling groove 45, in which a capsule can be accommodated in preassembled form in a standby position. A further sealing element 12" is arranged concentrically with respect to the sealing element 12' and interacts with the encircling extension 36 (see FIG. 1) of a capsule 2. Furthermore, sealing elements 12" are arranged around the transparent regions 27, 27'. On its device side 7, the adapter has an inlet 8 which is fluidically connected to the means 5 for introducing a liquid into the capsule. The discharging region 11 has, in the central region of the adapter, an outlet 9 which, in correct use, corresponds with a beverage preparation device in order to dispense the prepared beverage. An encircling collar 30 is arranged concentrically around this outlet 9.

Figure 3:
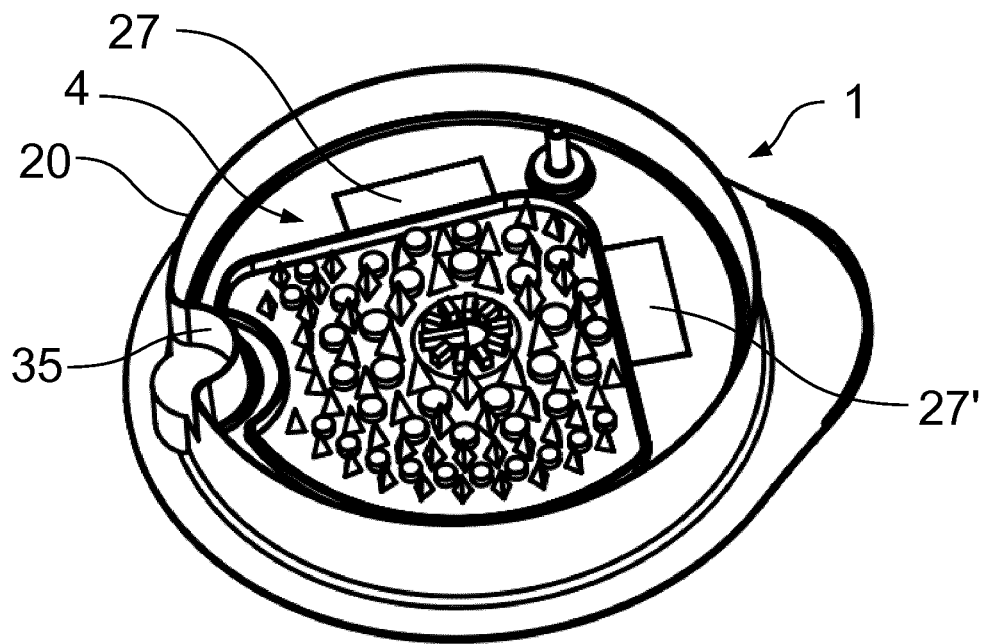
FIG. 3 shows a perspective view of the adapter according to FIG. 2.
Figure 4:
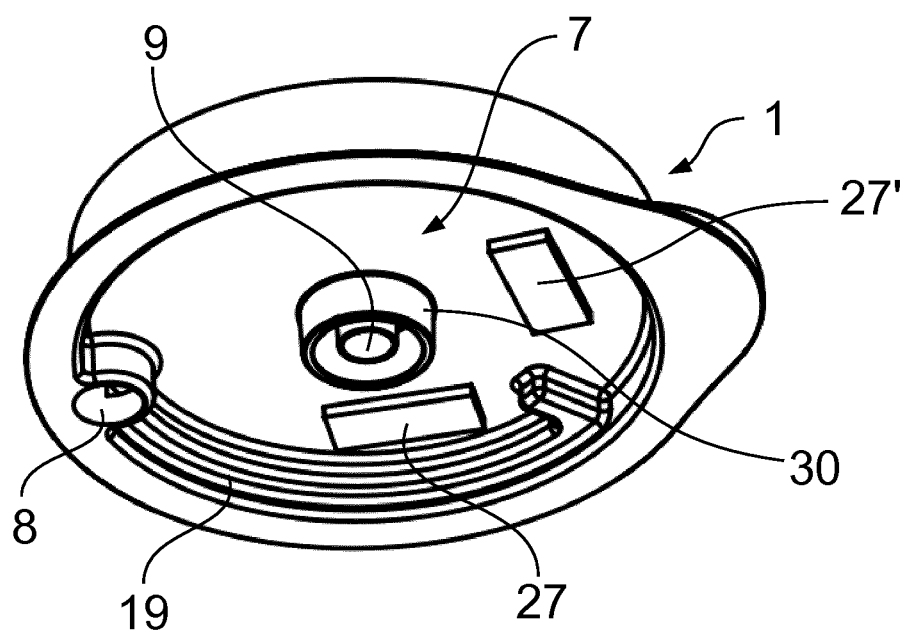
FIG. 4 shows a perspective view of the adapter according to FIG. 2, FIGS. 5a and 5b show a perspective view of a further embodiment of an adapter according to the invention.

FIGS. 3 and 4 illustrate the capsule side 4 and device side 7, respectively, of the adapter 1 according to FIG. 2, in each case in a perspective illustration. It can be seen that the adapter 1 has a substantially disk-shaped form. In addition, an indentation 35 can be seen in the encircling collar 20 of the adapter 1. The two transparent regions 27 and 27' can be seen. Furthermore, the outlet 9 which is surrounded by the encircling collar 30 can be seen. The inlet 8 of the adapter 1 is arranged in the periphery thereof and opens into a closed intermediate volume 19 which is in the form of a duct and of which only the outer contour is visible in FIG. 4. For further details, reference is made to the description with respect to FIG. 2.

FIGS. 5a and 5b and 6a and 6b each illustrate, in a perspective view, a further embodiment of an adapter 1 according to the invention looking at the device side 7 thereof. The intermediate volume 19 which is in the form of a duct and connects the inlet 8 to the means 5 (see FIG. 2) for introducing a liquid into the capsule can clearly be seen. The centrally arranged outlet 9 can furthermore be seen. The adapter has in each case a basic body 17 on which a covering 67 is arranged by means of a film hinge 74. By configuration of basic body 17 and covering 67 as an integral part, cost-effective production can be realized. By means of the film hinge 74, the covering 67 can be folded over and sealed on the intermediate volume 19, which is in the form of a duct. In this case, the covering element 67 in FIGS. 5a and 5b only covers the intermediate volume 19 which is in the form of a duct, while, in FIGS. 6a and 6b, the covering element 67 is configured with a large surface and covers the entire device side 7 of the adapter. Depending on the configuration of the covering element 67, an opening can be provided in the covering 67 in the region of the inlet 8 and the outlet 9 (see FIG. 6b).

Figure 7:
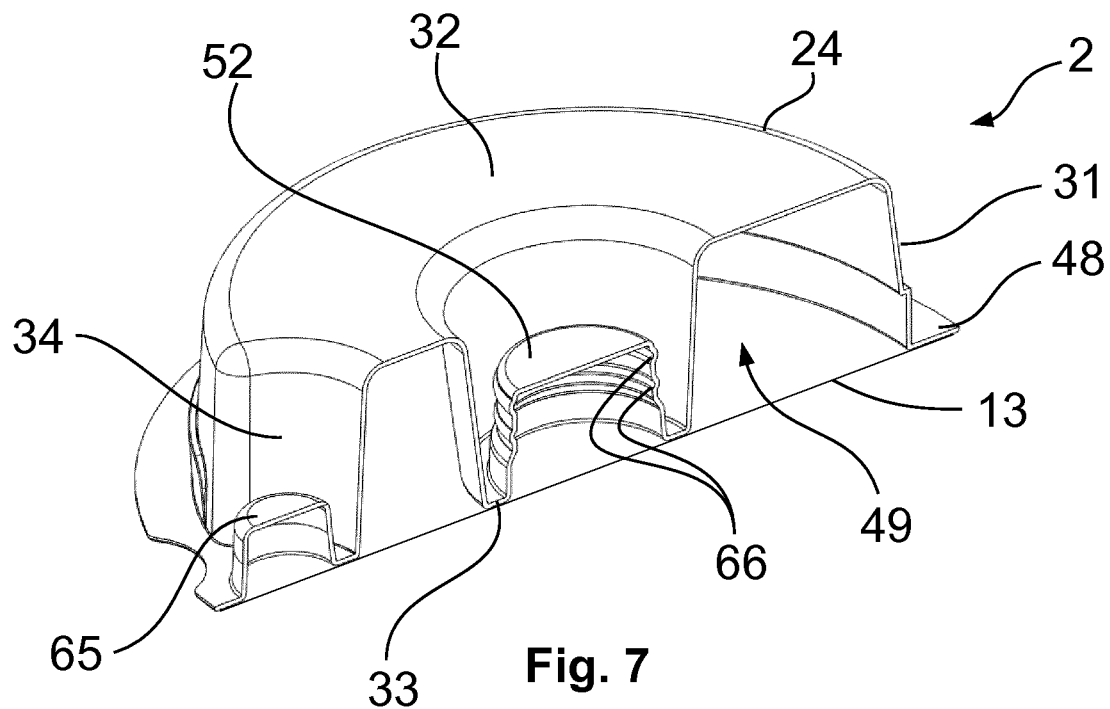
FIG. 7 shows a perspective sectional view of a further embodiment of a capsule for preparing a beverage.

FIG. 7 shows a perspective sectional view of a further embodiment of a capsule 2 for preparing a beverage. The capsule 2 comprises a capsule body 24 which has a base 32, a side wall 31 and a flange-like edge 48. The capsule body 24 is closed by a cover which, in interaction with the adapter, forms the contact surface 13. A substance chamber 49 is therefore formed in the interior of the capsule body 24. The side wall 31 of the capsule body 24 has a lateral recess 34. In said recess 34, a cup-like structure 65, which is likewise closed by the cover or by the contact surface 13, is formed in the flange-like edge 48. There is no fluidic connection between said closed cup-like structure 65 and the substance chamber 49.

In a central region of the capsule cup 24, an elevation 33 which is directed toward the cover and extends as far as the plane of the flange-like edge 48 is arranged in the base 32. The cover or the contact surface 13 is likewise fixedly connected to said elevation 33. Within said elevation 33, the capsule body has an offset 52 which extends in turn in the direction of the capsule base 32. Said offset 52 is provided with two encircling flutes 66 on its inner wall. A beverage substance from which a beverage can be produced by supplying a liquid is accommodated (not illustrated) in the substance chamber 49. A machine-readable code (not shown) is arranged on the cover or on the contact surface 13 in such a manner that it can be read by a reading device.

Figure 8:
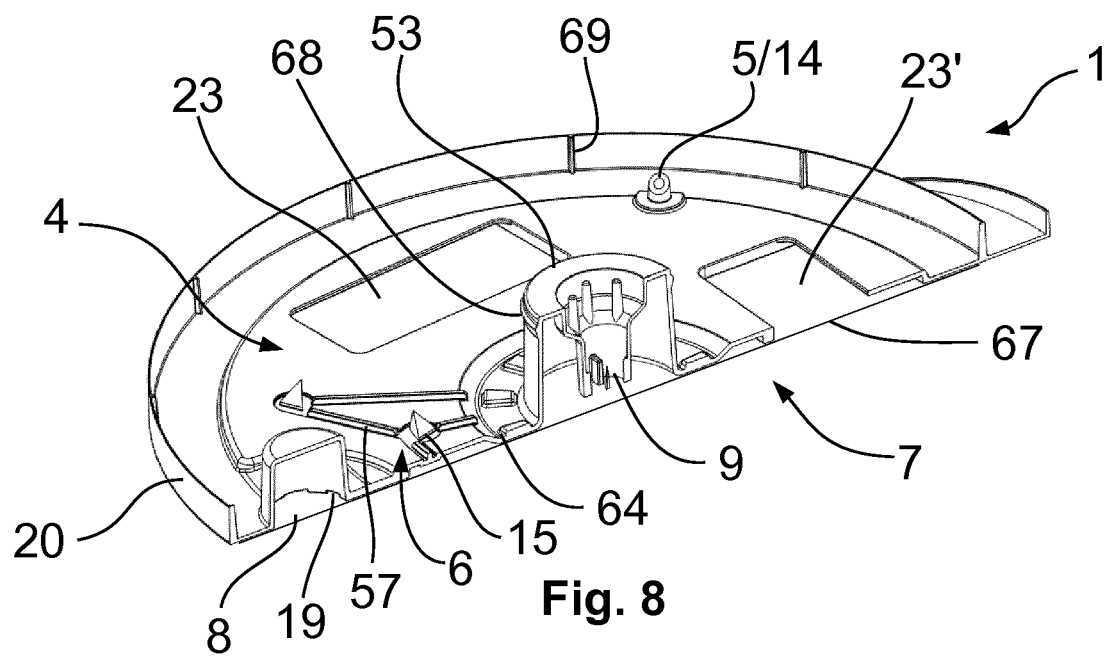
FIG. 8 shows a perspective sectional view of a further embodiment of an adapter according to the invention.

FIG. 8 shows, in a perspective sectional view, a further embodiment according to the invention of an adapter 1 which is provided for preassembly as a set together with the capsule 2 from FIG. 7. On its capsule side 4 assigned to the capsule, the adapter 1 has an encircling collar 20, means 5 for introducing a liquid into a capsule and means 6 for discharging a liquid from the capsule. In addition, a central projection 53 with an outlet 9, as a continuous connection from the capsule side 4 to the device side 7, can be seen. Said outlet 9 can correspond with an outlet stub of a beverage preparation device. In the upper region of its side wall, the projection 53 has an encircling rib 68 which can interact with a corresponding flute 66 (see FIG. 7) of a capsule. In addition, the encircling collar 20 of the adapter 1 has supporting structures 69 which support a capsule in a standby position.

Furthermore, the adapter 1 has two windows 23, 23' through which a machine-readable code arranged on a capsule can be read from the device side 7. Furthermore, an inlet 8 is formed which can correspond with an inlet stub of a beverage preparation device. The device side 7 of the adapter is provided over its entire area with a covering 67 which in particular closes the inlet 8 and the outlet 9. Between said covering 67 and the device side 7 of the adapter 1, an intermediate volume 19 is formed which fluidically connects the inlet 8 of the adapter 1 to the puncture cannula 14, i.e. to the means 5 for introducing a liquid into a capsule. The cover 67 is configured at least in the region of the windows 23, 23' in such a manner that a machine-readable code on a capsule arranged on the adapter can be read.

The means for introducing a liquid into a capsule comprise the puncture cannula 14 which has a sharp-edged edge in order to be able to pierce a contact surface 13 (see FIG. 7) of a capsule. The means 6 for discharging a liquid from the capsule comprise a plurality of pyramids 15 and collecting channels 57 which connect individual pyramids 15 to one another and/or to a collecting duct 64 encircling the projection 53. The collecting channels 57 and the collecting duct 64 are configured in such a manner that they form a closed duct system together with the contact surface 13 (see FIG. 7) of a capsule, if the latter is in the operating position on the adapter 1.

Figure 9:
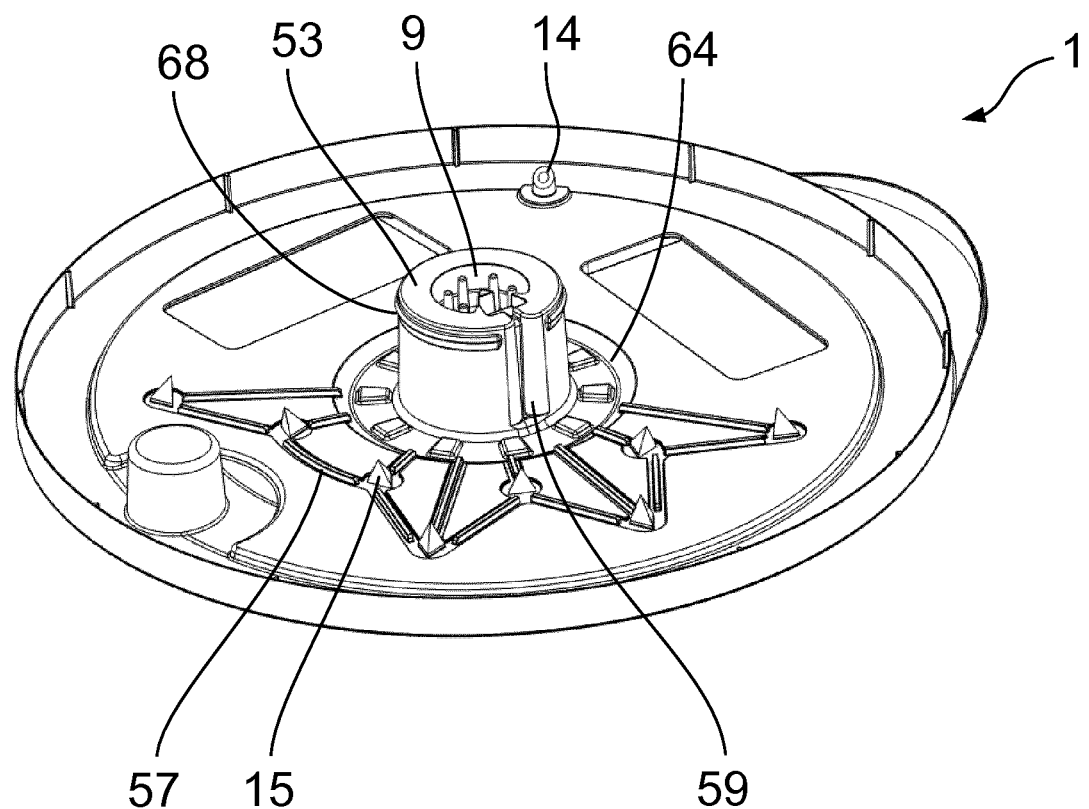
FIG. 9 shows a perspective view of the adapter according to FIG. 8.

FIG. 9 shows a perspective illustration of the adapter 1 according to FIG. 8. In this view of the adapter 1, a rising channel 59 can be seen laterally on the central projection 53, said rising channel being arranged starting from the collecting duct 64 of the side wall of the projection 53, said collecting duct encircling the central projection 53, to the upper end of said side wall. In the operating position, said rising channel 59 together with the capsule forms a rising duct 60 (see FIG. 14) through which the prepared beverage flows to the outlet 9. It is furthermore possible to see, on the capsule side, the means for introducing a liquid into a capsule, which means are in the form of a puncture cannula 14, and the means for discharging a liquid from the capsule, which means are in the form of pyramids 15. The pyramids 15 are connected to one another via the collecting channels 57 and are connected to the encircling collecting duct 64. In the upper region of its side wall, the central projection 53 has the encircling rib 68 which, in interaction with the corresponding flutes 66 (see FIG. 7), defines the standby position and operating position. For the further details of the adapter 1, reference is made to FIG. 8.

Figure 10:
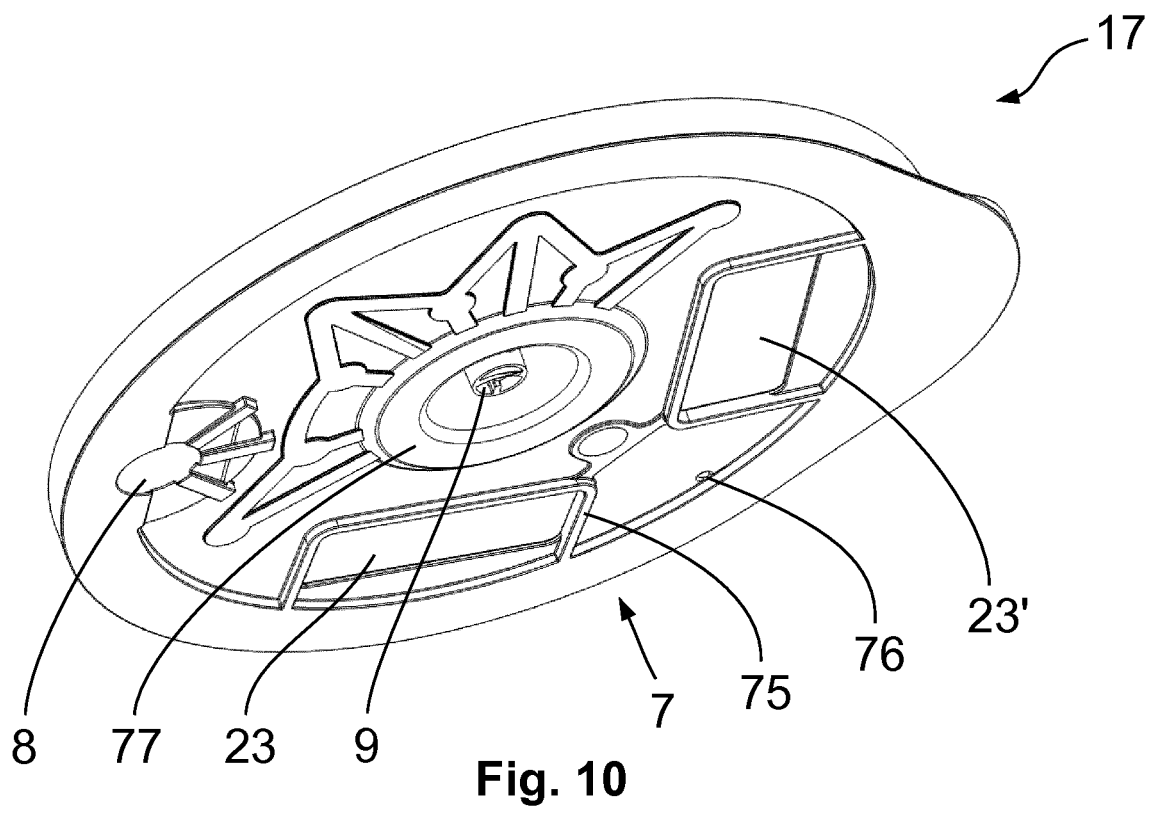
FIG. 10 shows a perspective view of the basic body of the adapter according to FIG. 8.

FIG. 10 illustrates, in a perspective view, a basic body 17 of the adapter 1 according to FIG. 8. The device side 7 is illustrated here. The outlet 9 which transfers a prepared beverage to a beverage preparation device is located centrally. Also visible are the two windows 23, 23' through which a machine-readable code on a capsule can be read by a beverage preparation device. These two windows 23, 23' are closed in an encircling manner by an edge structure 75 which is located on the same level as the edge of the basic body 17. Also depicted and visible is the inlet 8 which is located in the edge region of the basic body 17. A bore 76 which connects the device side 7 to the capsule side 4 (see FIG. 9) of the adapter 1 is likewise arranged in the edge region. On the capsule side of the adapter, the bore 76 opens into the puncture cannula 14 (see FIG. 9). The entire device side 7 of the basic body 17, apart from an encircling edge region and the edge structures 75 of the windows 23, 23' and a central support 77 arranged coaxially around the outlet 9, is arranged set back such that a film or covering 67 (see FIG. 8) spread out over the edge region can form the intermediate volume 19 (see FIG. 8).

Figure 11A:
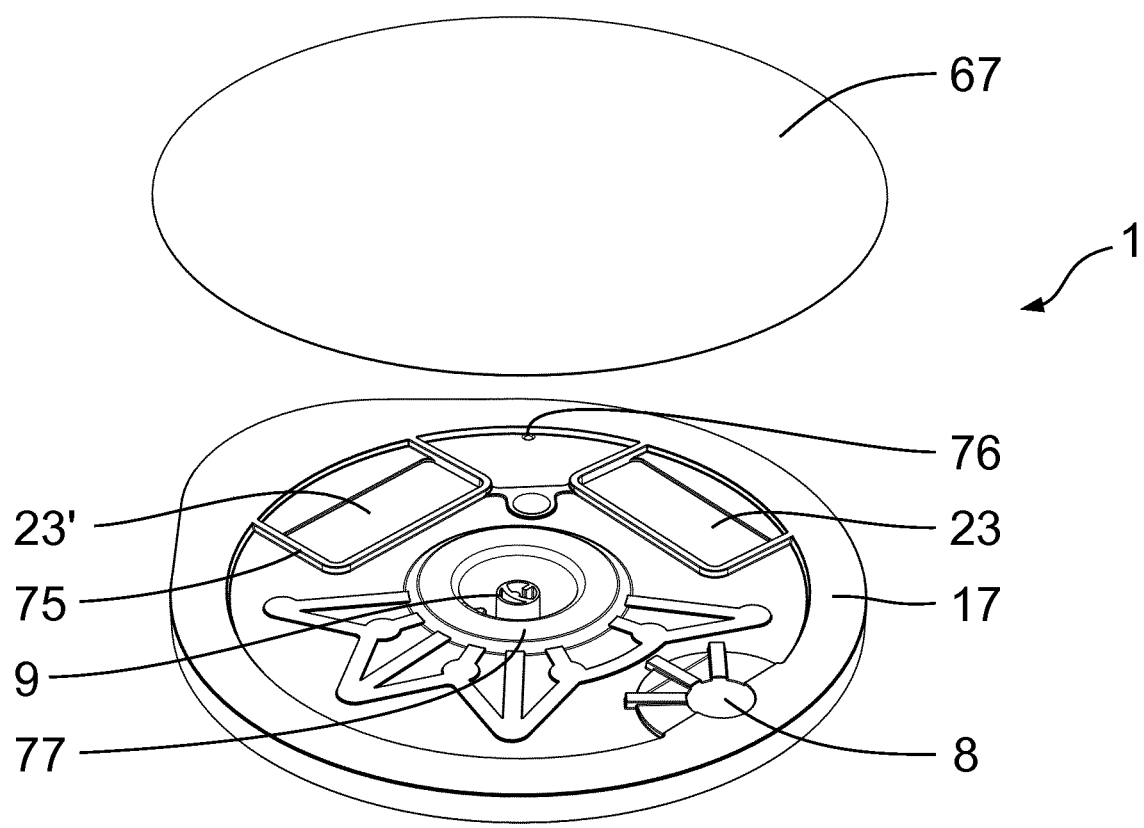
FIG. 11a shows a perspective view of the adapter according to FIG. 8 before the assembly thereof.
Figure 11B:
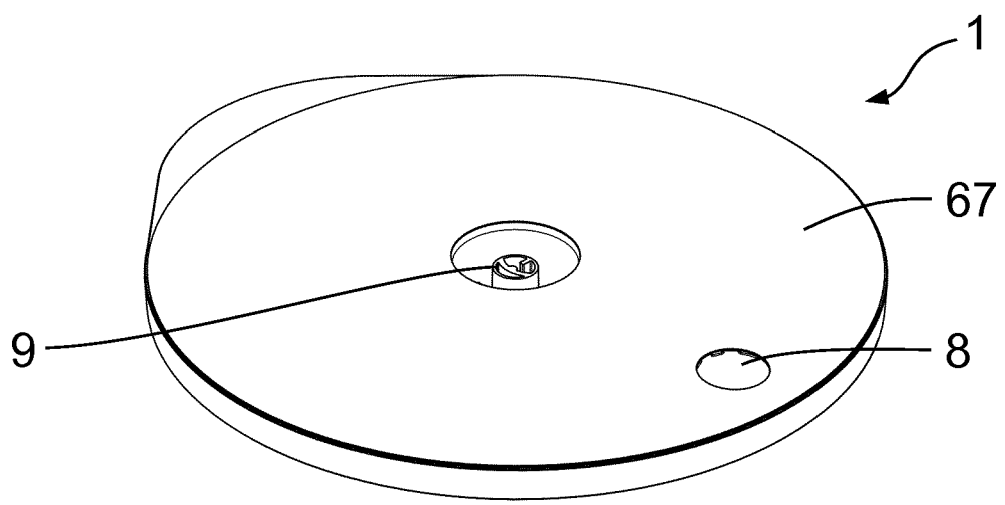
FIG. 11b shows a perspective view of the adapter according to FIG. 11 after the assembly thereof.

FIGS. 11a and 11b each show a perspective view of the adapter 1 according to FIG. 8 prior to the attaching of the covering 67 and, respectively, with the covering 67 fitted. The covering 67 is configured in a circular manner and, in the present case, is composed of a thin transparent film. However, it is also conceivable for said covering 67 to be configured transparently only in the regions in which it comes to lie on the two windows 23, 23'. The film 67 is sealed in the edge region of the basic body and on the edge structures 75 and the central supporting structure 77 on the basic body 17 of the adapter 1 such that an intermediate volume 19 (see FIG. 8) is formed, said intermediate volume fluidically connecting the inlet 8 to the bore 76 to the puncture cannula 14 (see FIG. 9). As illustrated in FIG. 11b, the covering 67 can also be configured in such a manner that it opens up the inlet 8 and the outlet 9. Corresponding openings are present in the covering 67. Alternatively, the covering 67 is, however, configured in such a manner that said openings for the inlet 8 and the outlet 9 can simply be produced when the adapter is inserted into a beverage preparation device.

Figure 12A:
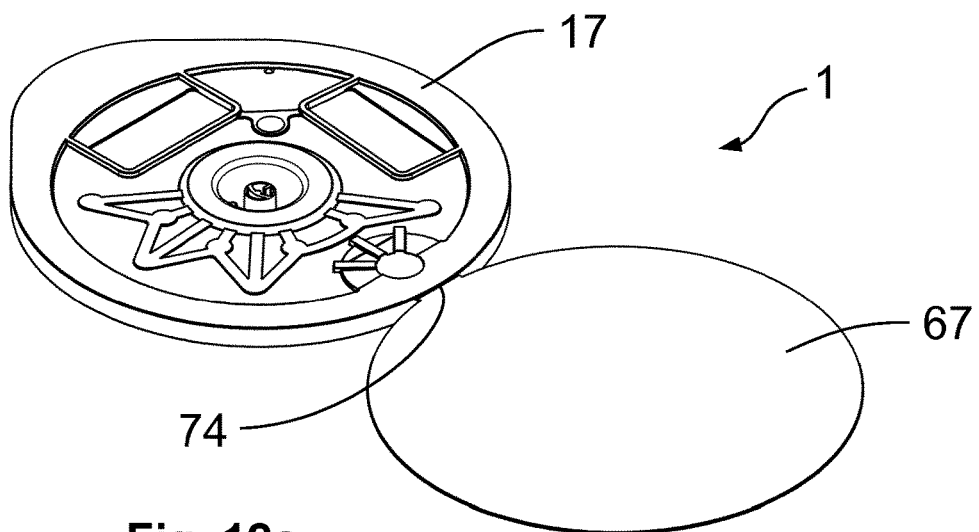
FIG. 12a shows a perspective view of a further embodiment of an adapter according to the invention with an integral covering.
Figure 12B:
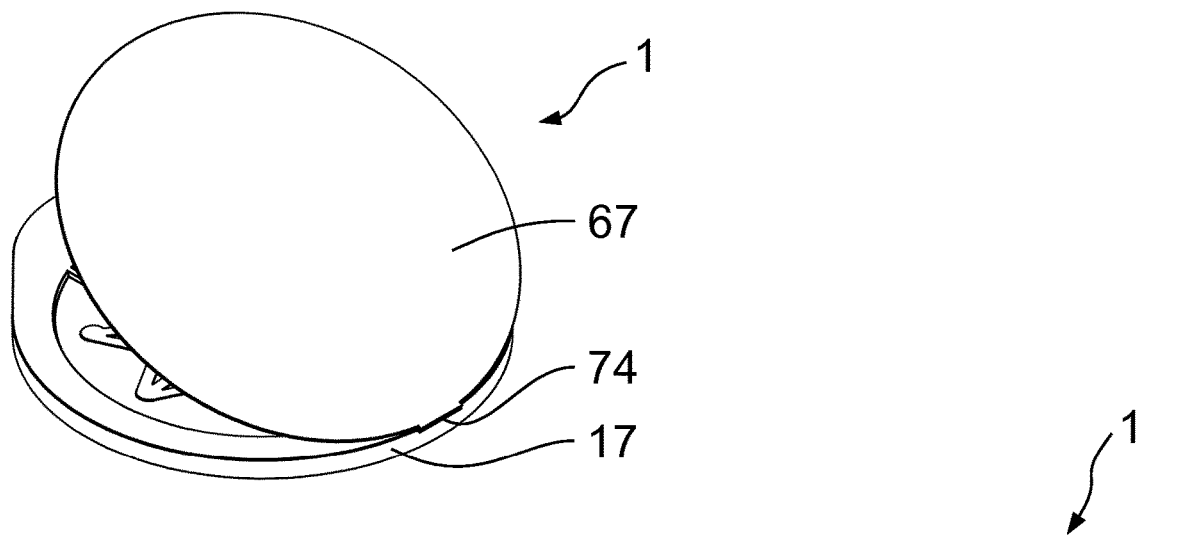
FIG. 12b shows a perspective view of the adapter according to FIG. 12a, wherein the covering is partially closed.
Figure 12C:
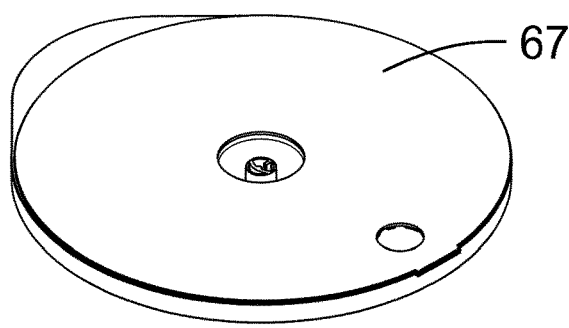
FIG. 12c shows a perspective view of the adapter according to FIG. 12a with a closed covering.

FIGS. 12a to 12c show a perspective view of a further embodiment of an adapter 1 according to the invention with an integrally formed covering 67. FIG. 12a shows the adapter 1 after being produced by injection molding, FIG. 12b shows same during the closing and FIG. 12c shows same after the closing of the intermediate volume. Apart from the fact that the covering 67 is integrally formed on the basic body 17 of the adapter 1, the function and the features of the adapter are identical to the adapter according to FIGS. 11a and 11b. The covering 67 is connected to the basic body 17 of the adapter via a film hinge 74. Such a film hinge can simply be produced by injection molding, and therefore cost-effective production of the adapter is possible.

Figure 13:
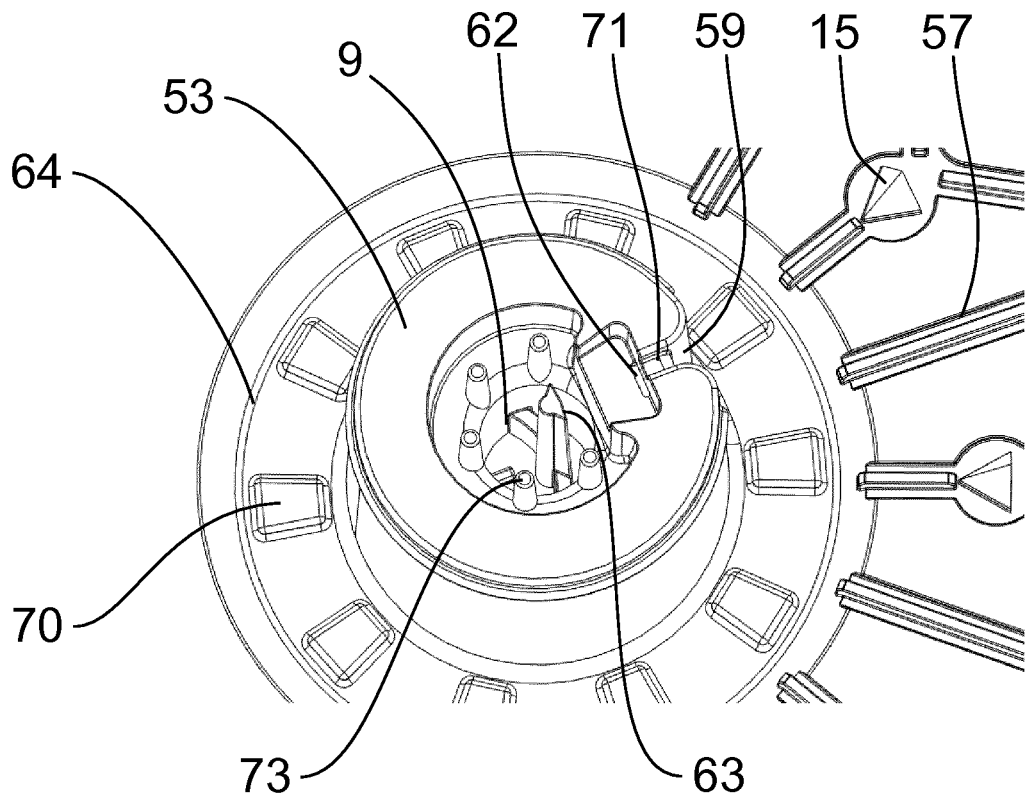
FIG. 13 shows an enlarged perspective view of a central projection of the adapter according to FIG. 9.

FIG. 13 depicts an enlarged perspective view of the central projection 53 of the adapter according to FIG. 9. The view is restricted to the projection 53, the encircling collecting duct 64 with its collecting channels 57 and a number of pyramids 15. Supporting surfaces 70 which protrude from the collecting duct and prevent closing of the collecting duct 64 by the capsule placed thereon in the operating position are formed in the encircling collecting duct 64. The rising channel 59 which, together with the capsule placed thereon in the operating position, forms a rising duct 60 (see FIG. 14) can likewise be seen.

The collecting channel 59 opens at the upper end, i.e. at its end opposite the collecting duct 64, into the outlet 9 of the adapter. As can be seen, the collecting duct 59 before opening into the outlet 9 passes through an outlet nozzle 71, and therefore a beverage jet is formed during operation. Said beverage jet is guided via a step and an air inlet opening 62 arranged in said step, so that the beverage jet can entrain air for improved frothing. An impact wall 63 which brings about homogenous mixing with air and promotes the frothing is additionally arranged in the outlet 9. Also arranged in the outlet 9 are five supporting posts 73 which influence the frothing and reduce the pore size of the froth.

Figure 14:
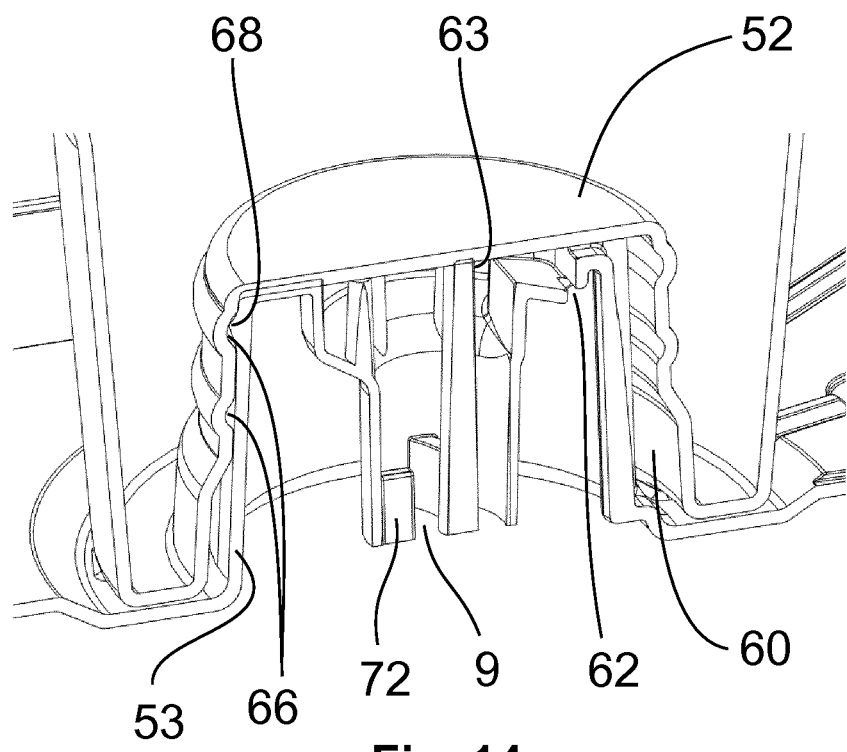
FIG. 14 shows an enlarged sectional view of the outlet when capsule and adapter are put together.
Figure 15:
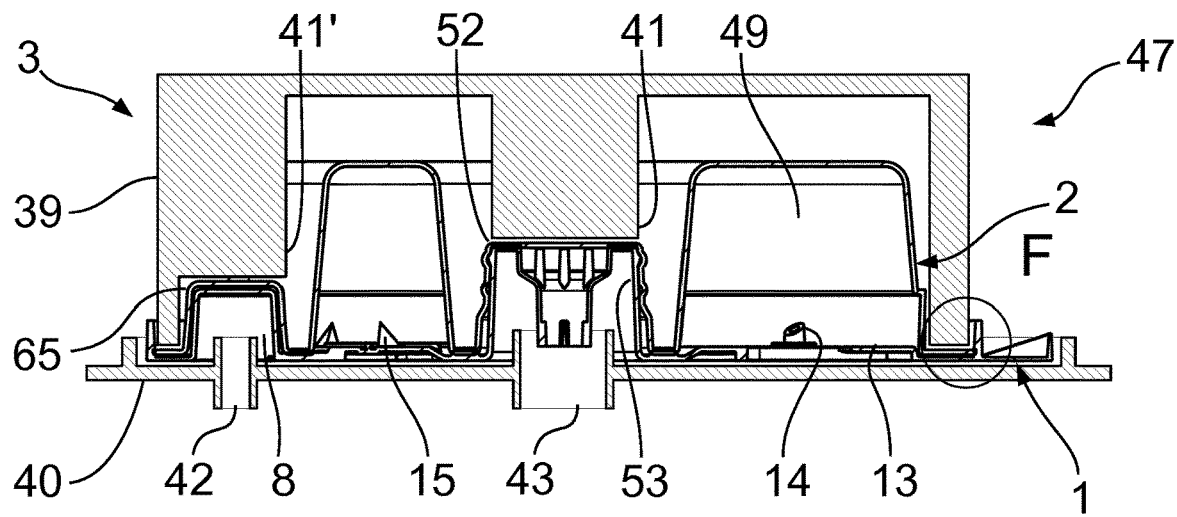
FIG. 15 shows a sectional view of a set consisting of a capsule according to FIG. 7 and an adapter according to FIG. 8, wherein the set is in the operating position.

FIG. 14 shows an enlarged perspective sectional view of the outlet 9 of the adapter according to FIG. 9, wherein a capsule according to FIG. 7 is placed onto the adapter in an operating position. The sectional plane runs through the rising channel 59 (see FIG. 13) and therefore through the rising duct 60 formed from rising channel and offset 52 of the capsule. The offset 52 of the capsule is latched with one of its two flutes 66 to the rib 68 of the projection 53 of the adapter. The rising duct 60 which is formed by the rising channel and the projection of the capsule opens into the outlet 9, wherein a beverage jet formed by the outlet nozzle 71 (see FIG. 13) is guided via the air inlet opening 62 and subsequently strikes against the impact wall 63. Air can be entrained through the air inlet opening 62 into the beverage jet, said air being homogeneously mixed with the beverage at the impact wall 63, thus forming a froth. In addition to the impact wall 63, the outlet 9 is provided with steering wings 72 which shape and/or additionally homogenize the beverage jet emerging from the outlet 9.

Figure 19:
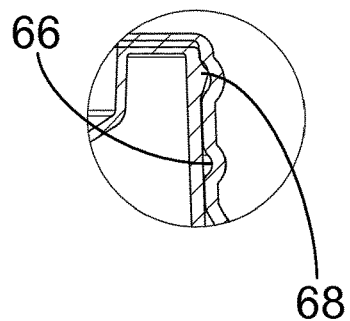
FIG. 19 shows an enlargement of the partial region H from FIG. 17.
Figure 18:
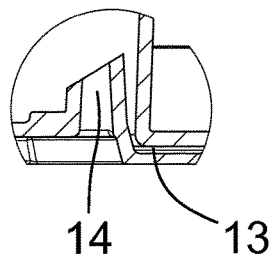
FIG. 18 shows an enlargement of the partial region E from FIG. 17.
Figure 16:
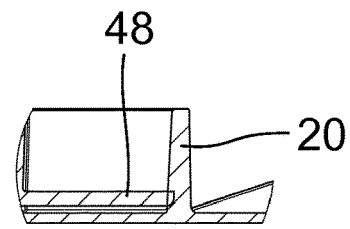
FIG. 16 shows an enlargement of the partial region F from FIG. 15.
Figure 17:
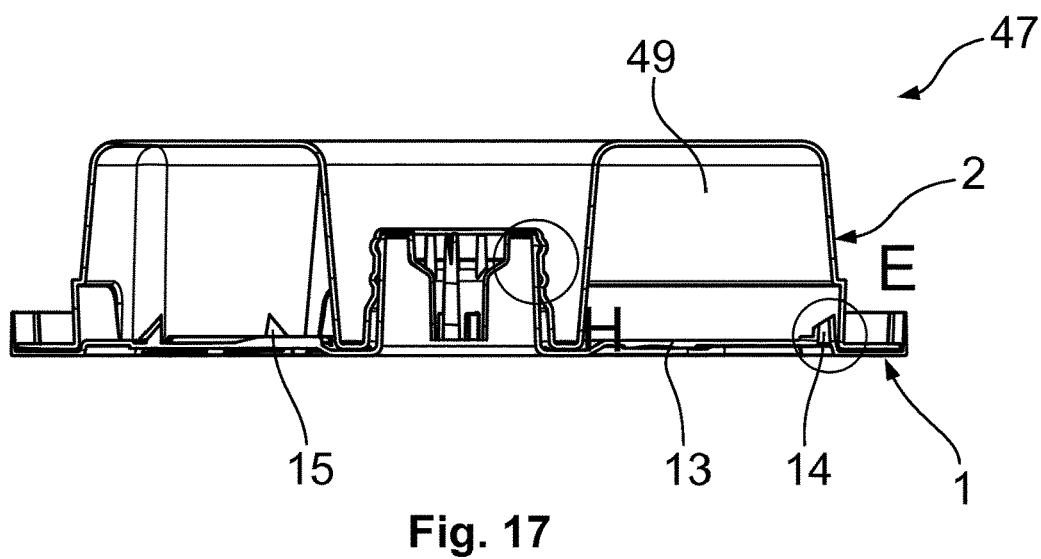
FIG. 17 shows the sectional view according to FIG. 15 with a sectional plane through the puncture cannula.

FIGS. 15 to 19 each depict a set 47 consisting of a capsule 2 according to FIG. 7 and an adapter 1 according to FIG. 8, wherein the set is in the operating position. FIGS. 16, 18 and 19 are enlarged detail views of FIGS. 15 and 17. A beverage preparation device 3 is indicated only in FIG. 15, with only an upper part 39 and a lower part 40 of a capsule holder being shown. The upper part 39 of the capsule holder has two punches 41, 41'. The punch 41 engages from the upper side in the illustration in the elevation of the base 32 and on the offset 52 thereof of the capsule 2. The punch 41' engages in the recess 34 of the side wall 31 (see FIG. 7) and in the cup-like structure 65 of the capsule 2. The lower part 40 of the capsule holder has an inlet stub 42 which engages in the inlet 8 of the adapter 1 and via which a pressurized liquid can be provided. Furthermore, the lower part 40 of the capsule holder has an outlet stub 43 in which the outlet 9 (see FIG. 8) of the adapter 1 can engage.

The capsule 2 rests flat on the capsule side 4 (see FIG. 8) of the adapter 1. The inlet 8 of the adapter 1 has been pushed completely into the cup-like structure 65 of the capsule 2. The rib 68 of the central projection 53 of the adapter 1 lies in the second upper flute 66 of the offset 52 of the capsule 2. The flange-like edge 48 of the capsule 2 is no longer supported on the outer edge of the encircling collar 20 of the adapter 1, but rather likewise rests flat on the adapter 1. The puncture cannula 14 has pierced the cover 13 of the capsule 2 and, accordingly, a fluidic connection from the inlet 8 through the duct 19 (see FIG. 8) and the puncture cannula 14 into the substance chamber 49 has been produced. The pyramids 15 have also pierced the cover 13 of the capsule 2, and therefore a beverage formed in the substance chamber 49 can flow through the openings, which are created by the pyramids 15, into the collecting channels 57 (see FIG. 8) and the collecting duct 64 (see FIG. 8).

The invention claimed is:

1. An adapter for use in preparing a beverage with a capsule comprising a capsule body for receiving the beverage ingredients and a cover closing off the capsule body, and a beverage preparation device,
   wherein the adapter can be placed together with the capsule into the beverage preparation device,
   the adapter comprises a basic body being generally disk shaped with a top side to receive a capsule and a bottom side to be connected to a beverage preparation device,
   means for introducing a liquid into the capsule and means for discharging a liquid from the capsule are arranged on the top side of the basic body such that both the introduction of liquid into the capsule and the discharge of liquid from the capsule take place on only one side of the capsule,
   an inlet for the liquid provided by the beverage preparation device and also an outlet are arranged on the bottom side of the basic body,
   the inlet is fluidically connected to the means for introducing the liquid into the capsule and the outlet is fluidically connected to the means for discharging the liquid from the capsule,
   the bottom side of the basic body is at least partially covered with a covering in order to form an intermediate volume, between the basic body and the covering, via which the inlet is fluidically connected through the intermediate volume to the means for introducing the liquid into the capsule,
   wherein the inlet and the means for introducing the liquid into the capsule are placed separated locally from one another at different angular orientation with regard to a center of the generally disk shaped basic body.

2. The adapter according to claim 1, wherein the bottom side of the basic body is completely covered with the covering.

3. The adapter according to claim 1, wherein the basic body is formed from a plastics material.

4. The adapter according to claim 1, wherein the covering is formed by a film or a foil.

5. The adapter according to claim 1, wherein the covering is formed integrally with the basic body.

6. The adapter according to claim 1, wherein the covering for forming the intermediate volume is connected to the basic body by at least one of adhesive bonding or sealing.

7. The adapter according to claim 1, wherein the means for introducing the liquid into the capsule comprises at least one penetration element for penetrating a contact surface of the capsule.

8. The adapter according to claim 1, wherein the means for discharging the liquid from the capsule comprises at least one penetration element for penetrating the contact surface of the capsule.

9. The adapter according to claim 1, wherein the top side has at least one structure for at least one of securing and positioning the capsule.

10. The adapter according to claim 9, wherein said at least one structure has a projection which is configured for engaging in a corresponding offset of the capsule.

11. The adapter according to claim 9, wherein the adapter has, on at least one of said at least one structure, latching means, which can be latched to corresponding latching means of the capsule.

12. The adapter according to claim 10, wherein the outlet is arranged within the projection.

13. A capsule for preparing a beverage with an adapter according to claim 10, and a beverage preparation device, wherein the capsule can be placed together with the adapter into the beverage preparation device, the capsule comprises a capsule body which is covered with a cover, the cover forms the contact surface of the capsule and closes the capsule body, and the capsule body has at least one offset for engagement of a projection of the adapter.

14. A set comprising an adapter according to claim 1, and at least one capsule.

15. A beverage preparation system comprising as set according to claim 14, and a beverage preparation device.

16. The adapter according to claim 3, wherein the basic body is formed by injection molding.

17. The adapter according to claim 1, wherein the covering is formed by an aluminum foil or a plastics film.

18. The adapter according to claim 1, wherein the covering is formed by a plastics film composed of a plastics material selected from the group comprising PET, PET/PP and PET/heat-sealing lacquer, or from a multi-layered laminate.

19. The adapter according to claim 1, wherein the covering for forming the intermediate volume is connected to the basic body by heat sealing or ultrasonic sealing.

20. The adapter according to claim 1, wherein the means for introducing the liquid into the capsule comprise at least one puncture cannula for penetrating a contact surface of the capsule.

21. The adapter according to claim 8, wherein the at least one penetration element is selected from the group comprising pyramids, spikes, cones, truncated pyramids, truncated cones, cylinders and prisms.

22. The adapter according to claim 10, wherein the projection is configured to be circular-cylindrical.

23. The adapter according to claim 11, wherein the latching means are in the form of at least one of a groove or a latching lug.

24. The adapter according to claim 12, wherein the projection is centrally arranged.

25. The capsule according to claim 13, wherein the cover hermetically closes the capsule body.

26. The set according to claim 14, wherein the at least one capsule is for preparing a beverage with an adapter and a beverage preparation device, the at least one capsule can be placed together with the adapter into the beverage preparation device, the at least one capsule comprises a capsule body which is covered with a cover, the cover forms the contact surface of the at least one capsule and closes the capsule body, and the capsule body has at least one offset for engagement of a projection of the adapter.

\* \* \* \* \*